(12) United States Patent
Zhang (10) Patent No.: US 8,010,344 B2
(45) Date of Patent: Aug. 30, 2011

(54) DICTIONARY WORD AND PHRASE DETERMINATION

(75) Inventor: Po Zhang, Beijing (CN)

(73) Assignee: Google Inc., Mountain View, CA (US)

( * ) Notice: Subject to any disclaimer, the term of this patent is extended or adjusted under 35 U.S.C. 154(b) by 991 days.

(21) Appl. No.: 11/870,074

(22) Filed: Oct. 10, 2007

(65) Prior Publication Data
US 2008/0312910 A1 Dec. 18, 2008

(30) Foreign Application Priority Data

Jun. 14, 2007 (WO) ................ PCT/CN2007/001870

(51) Int. Cl.
*G06F 17/21* (2006.01)
*G06F 17/27* (2006.01)

(52) U.S. Cl. .............................................. 704/10; 704/9

(58) Field of Classification Search ........................ None
See application file for complete search history.

(56) References Cited

U.S. PATENT DOCUMENTS

| 5,111,398 | A | 5/1992 | Nunberg et al. |
|---|---|---|---|
| 5,544,049 | A | 8/1996 | Henderson et al. |
| 5,819,265 | A | 10/1998 | Ravin et al. |
| 6,009,382 | A | 12/1999 | Martino et al. |
| 6,073,146 | A | 6/2000 | Chen |
| 6,282,508 | B1 | 8/2001 | Kimura et al. |
| 6,687,689 | B1 * | 2/2004 | Fung et al. ............................. 1/1 |
| 6,704,698 | B1 | 3/2004 | Paulsen et al. |
| 6,917,910 | B2 | 7/2005 | Itoh et al. |
| 6,964,014 | B1 | 11/2005 | Parish |
| 7,158,930 | B2 | 1/2007 | Pentheroudakis et al. |
| 7,315,982 | B2 | 1/2008 | Becker |
| 7,424,421 | B2 * | 9/2008 | Okumura .......................... 704/8 |
| 2004/0215465 | A1 | 10/2004 | Lee |
| 2005/0071148 | A1 | 3/2005 | Huang et al. |
| 2006/0100856 | A1 | 5/2006 | Kang et al. |
| 2006/0248459 | A1 | 11/2006 | Su |
| 2007/0118356 | A1 | 5/2007 | Badino |
| 2007/0265382 | A1 | 11/2007 | Yamamoto |

FOREIGN PATENT DOCUMENTS

| CN | 1567358 | 1/2005 |
|---|---|---|
| CN | 1912872 | 2/2007 |
| JP | 2003-178260 | 6/2003 |

(Continued)

OTHER PUBLICATIONS

Xia et al., "Method of Special Domain Lexicon Construction Based on Raw Materials," *Mini-Micro Systems*, 26(6):1088-1092 (Jun. 2005).

(Continued)

*Primary Examiner* — Brian L Albertalli
(74) *Attorney, Agent, or Firm* — Fish & Richardson P.C.

(57) ABSTRACT

Candidate words in search queries are identified, each candidate word including one or more consecutive characters. For each candidate word, a first count is determined, the first count representing a number of times that the candidate word is the only word in the search queries, and a second count is determined, the second count representing a number of times that the candidate word and one or more other words are included in each of the search queries. One or more of the candidate words are added to an input method editor dictionary based on a relationship between the first count and the second count.

25 Claims, 6 Drawing Sheets

FOREIGN PATENT DOCUMENTS

| | | |
|---|---|---|
| JP | 2005-107614 A | 4/2005 |
| WO | WO 2004/111921 | 12/2004 |
| WO | WO 2008014702 | 2/2008 |

OTHER PUBLICATIONS

Chien, "PAT-Tree-Based Keyword Extraction for Chinese Information Retrieval," Proceedings of the ACM SIGIR International Conference on Information Retrieval, 1997, pp. 50-58.

Grenager et al. "Unsupervised Discovery of a Statistical Verb Lexicon," Proceedings of the 2006 Conference on Empirical Methods in Natural Language Processing, 2006, 8 pages.

International Preliminary Report on Patentability for PCT Application No. PCT/CN2007/001870, mailed Dec. 17, 2009, 5 pages.

International Preliminary Report on Patentability for PCT Application No. PCT/CN2007/001871, mailed Dec. 30, 2009, 6 pages.

International Search Report and Written Opinion for PCT Application No. PCT/CN2007/001870, mailed Mar. 27, 2008, 10 pages.

International Search Report and Written Opinion for PCT Application No. PCT/CN2007/001871, mailed Apr. 3, 2008, 11 pages.

Li, X., et al., "An Effective Framework for Chinese Syntactic Parsing", Proceedings of World Academy of Science, Engineering and Technology, vol. 2, Jan. 2005, pp. 276-279.

Li, X., et al., "A Hierarchical Parsing Approach with Punctuation Processing for Long Chinese Sentences", Second International Joint Conference on Natural Language Processing: Companion Volume including Posters/Demos and tutorial abstracts, year: 2005, pp. 7-12.

Wang, M., et al., "A Fast, Accurate Deterministic Parser for Chinese", Proceedings of the 21st International Conference on Computational Linguistics and 44th Annual Meeting of the Association for Computational Linguistics (ACL), Sydney, Australia, Jul. 17-18, 2006, Annual Meeting of the ACL. Association for Computational Linguistics, pp. 425-432.

* cited by examiner

DICTIONARY WORD AND PHRASE DETERMINATION

RELATED APPLICATIONS

This application is a continuation of International Application No. PCT/CN2007/001870, titled "DICTIONARY WORD AND PHRASE DETERMINATION", filed on Jun. 14, 2007, the contents of which are incorporated herein by reference.

BACKGROUND

This disclosure relates to input methods.

Languages that use a logographic script in which one or two characters, for example, glyphs, correspond roughly to one word or meaning have more characters than keys on a standard input device, such as a computer keyboard on a mobile device keypad. For example, the Chinese language contains thousands of characters defined by base Pinyin characters and five tones. The mapping of these many-to-one associations can be implemented by input methods that facilitate entry of characters and symbols not found on input devices. Accordingly, a Western-style keyboard can be used to input Chinese, Japanese, or Korean characters. In some examples, an input method editor (IME) can be used to search a dictionary to find candidate characters, words, or phrases that correspond to the Pinyin characters typed by a user.

SUMMARY

In one aspect, in general, a computer-implemented method includes identifying candidate words in search queries, each candidate word including one or more consecutive characters, and for each candidate word, determining a first count representing a number of times that the candidate word is the only word in the search queries, and determining a second count representing a number of times that the candidate word and one or more other words are included in each of the search queries. The method includes adding one or more of the candidate words to an input method editor dictionary based on a relationship between the first count and the second count.

Implementations of the method can include one or more of the following features. Adding one or more of the candidate words to the input method editor dictionary includes adding a candidate word to the input method editor dictionary when the first count is larger than the second count. Adding one or more of the candidate words to the input method editor dictionary includes adding a candidate word to the input method editor dictionary when the first count is larger than the second count and the first count is larger than a threshold value. Determining the second count includes counting a number of search queries that each includes the candidate word and one or more other words, in which the candidate word and the one or more other words are separated by one or more white spaces or punctuation marks entered by users who submitted the search queries. The method includes obtaining the search queries from a search log. The search log includes search queries submitted by users of a search service.

In another aspect, in general, an apparatus includes a data store to store search queries, and a processing device to identify candidate words in the search queries, each candidate word including one or more consecutive characters. For each candidate word, the processing device determines a first count representing a number of times that the candidate word is the only word in the search queries, and determines a second count representing a number of times that the candidate word and one or more other words are included in each of the search queries. The processing device adds one or more of the candidate words to an input method editor dictionary based on a relationship between the first count and the second count.

Implementations of the apparatus can include one or more of the following features. The processing device adds a candidate word to the input method editor dictionary when the first count is larger than the second count. The processing device adds a candidate word to the input method editor dictionary when the first count is larger than the second count and the first count is larger than a threshold value. The processing engine counts a number of search queries that each includes the candidate word and one or more other words, in which the candidate word and the one or more other words are separated by one or more white spaces or punctuation marks entered by users who submitted the search queries.

In another aspect, in general, a system includes a data store to store search queries, and a processing engine stored in computer readable medium and including instructions executable by a processing device that upon such execution cause the processing device to identify candidate words in the search queries, each candidate word comprising one or more consecutive characters. The processing engine includes instructions that upon execution cause the processing device to, for each candidate word, determine a first count representing a number of times that the candidate word is the only word in the search queries, and determine a second count representing a number of times that the candidate word and one or more other words are included in each of the search queries. The processing engine includes instructions that upon execution cause the processing device to add one or more of the candidate words to an input method editor dictionary based on a relationship between the first count and the second count.

Implementations of the system can include one or more of the following features. The processing engine includes instructions executable by the processing device and upon such execution cause the processing device to add a candidate word to the input method editor dictionary when the first count is larger than the second count. The processing engine includes instructions executable by the processing device and upon such execution cause the processing device to add a candidate word to the input method editor dictionary when the first count is larger than the second count and the first count is larger than a threshold value. The processing engine includes instructions executable by the processing device and upon such execution cause the processing device to count a number of search queries that each includes the candidate word and one or more other words, in which the candidate word and the one or more other words are separated by one or more white spaces or punctuation marks entered by users who submitted the search queries.

In another aspect, in general, an apparatus includes a dictionary having words identified based on a first count representing a number of times that the word is the only word in search queries and a second count representing a number of times that the word and one or more other words are in each of the search queries. The apparatus includes an input method editor configured to select words from the dictionary.

Implementations of the apparatus can include one or more of the following features. The input method editor includes a Chinese input method editor. The words include Hanzi characters. The search queries are identified from a search log.

In another aspect, in general, a system includes a data store and a processing engine. The data store stores a dictionary that includes words that are identified based on a first count representing a number of times that the word is the only word in search queries and a second count representing a number of times that the word and one or more other words are included in each of the search queries. The processing engine is stored in computer readable medium and includes instructions executable by a processing device that upon such execution cause the processing device to provide an input method editor to enable a user to select words from the dictionary.

In another aspect, in general, a system includes a data store and a processing engine. The data store stores a dictionary that includes words that are identified based on a first count representing a number of times that the word is the only word in search queries and a second count representing a number of times that the word and one or more other words are included in each of the search queries. The processing engine causes a processing device to provide an input method editor to enable a user to select words from the dictionary.

In another aspect, in general, a system includes means for identifying candidate words based on a first count representing a number of times that the word is the only word in search queries and a second count representing a number of times that the word and one or more other words are included in each of the search queries, and means for adding one or more of the candidate words to an input method editor dictionary.

In another aspect, in general, a computer-implemented method includes identifying context signals in documents, identifying characters bounded by the context signals, identifying one or more candidate words defined by the characters bounded by the context signals, and adding one or more of the candidate words to an input method editor dictionary.

Implementations of the method can include one or more of the following features. Identifying context signals in documents includes identifying Chinese book title marks. Identifying characters bounded by the context signals includes identifying Hanzi characters bounded by the context signals. The candidate words include Chinese words. Identifying context signals in documents includes identifying hypertext markup language tags in electronic documents. The input method editor dictionary includes a Chinese input method editor dictionary. The method includes determining a count of each candidate word. Adding one or more of the candidate words to the input method editor dictionary includes adding candidate words having a count that exceeds a threshold to the input method editor dictionary. Identifying context signals in documents includes identifying non-duplicative documents. Determining a count of each candidate word includes determining the count of each candidate word based on only the non-duplicative documents. The documents include web documents obtained from the Internet. The method includes identifying candidate words in search queries and adding one or more of the candidate words to the input method editor dictionary. Identifying candidate words in search queries includes, for each candidate word, determining a first count representing a number of times that the candidate word is the only word in the search queries, and determining a second count representing a number of times that the candidate word and one or more other words are included in each of the search queries. Identifying candidate words in search queries includes adding one or more of the candidate words to the input method editor dictionary based on a relationship between the first count and the second count.

In another aspect, in general, a computer-implemented method includes identifying pairs of Chinese book title marks in documents, identifying a candidate word defined by one or more characters marked by each pair of Chinese book title marks, and adding one or more candidate words to an input method editor dictionary.

Implementations of the method can include one or more of the following features. The Chinese book title marks include single book title marks or double book title marks. The method includes determining a count of each candidate word. Adding one or more candidate words to an input method editor dictionary includes adding candidate words having a count that exceeds a threshold to the input method editor dictionary. The method includes identifying candidate words in search queries and adding one or more of the candidate words to the input method editor dictionary. Identifying candidate words in search queries includes, for each candidate word, determining a first count representing a number of times that the candidate word is the only word in the search queries, and determining a second count representing a number of times that the candidate word and one or more other words are included in each of the search queries. Identifying candidate words in search queries includes adding one or more of the candidate words to the input method editor dictionary based on a relationship between the first count and the second count.

In another aspect, in general, a method includes establishing a dictionary having words that are identified based on characters bounded by context signals, and providing an input method editor configured to select words from the dictionary.

Implementations of the method can include one or more of the following features. Establishing the dictionary includes identifying words based on characters bounded by Chinese book title marks.

In another aspect, in general, an apparatus includes a dictionary that has words identified based on candidate words associated with characters found in documents, in which each candidate word is associated with one or more characters enclosed in a pair of Chinese book title marks. The apparatus includes an input method editor configured to select words from the dictionary.

Implementations of the apparatus can include one or more of the following features. The candidate words include Hanzi characters. The Chinese book title marks include at least one of single book title marks or double book title marks. The dictionary includes words identified based on a first count representing a number of times that the word is the only word in search queries and a second count representing a number of times that the word and one or more other words are in each of the search queries.

In another aspect, in general, a system includes a data store and a processing engine. The data store stores a document corpus. The processing engine is stored in computer readable medium and includes instructions executable by a processing device that upon such execution cause the processing device to identify candidate words by finding characters in documents of the document corpus in which the characters are enclosed in pairs of Chinese book title marks, and add one or more of the candidate words to an input method editor dictionary.

In another aspect, in general, a system includes a data store and the processing device. The data store stores a document corpus. The processing device identifies candidate words by finding characters in documents in the document corpus in which the characters are enclosed in pairs of Chinese book title marks, and adds one or more of the candidate words to an input method editor dictionary.

In another aspect, in general, a system includes means for identifying context signals in documents, means for identifying characters bounded by the context signals, means for identifying one or more candidate words defined by the characters bounded by the context signals, and means for adding one or more of the candidate words to an input method editor dictionary.

In another aspect, in general, a system includes means for identifying pairs of Chinese book title marks in documents, means for identifying a string of one or more characters bounded by each pair of Chinese book title marks, means for identifying a candidate word defined by each string of one or more characters, and means for adding one or more of the candidate words to an input method editor dictionary.

The systems and methods disclosed herein may have one or more of the following advantages. A dictionary can be automatically established or enhanced based on a corpus of documents and query logs. IME utilizing the dictionary can provide more accurate identifications of candidate words for selection. Also, by using the system and method disclosed herein, the dictionary can be efficiently updated, and the speed and efficiency for the computer processing the logographic script, e.g., Chinese characters, can be improved, and therefore the user's input speed of the logographic script can be increased.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
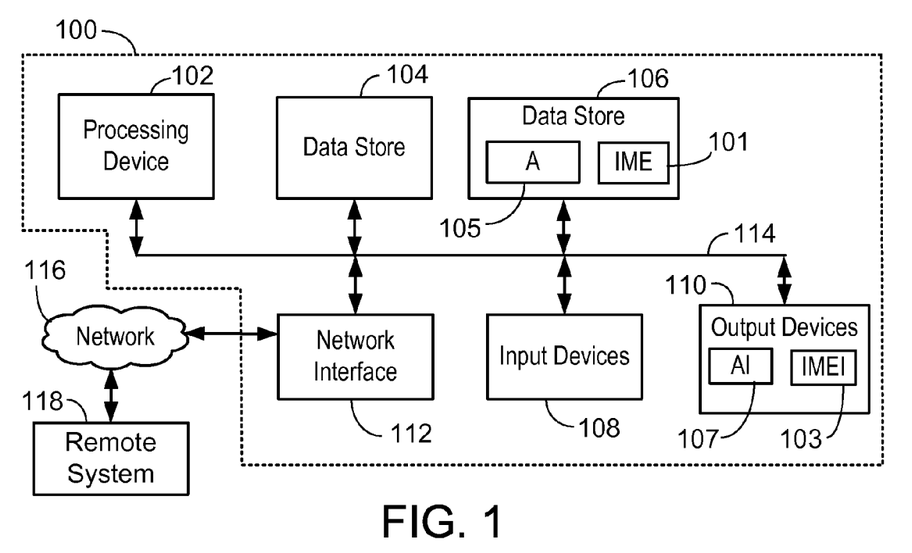
FIG. 1 is a block diagram of an example device that can be used to implement the systems and methods described herein.

FIG. 1 is a block diagram of an example device 100 that can be utilized to implement the systems and methods described herein. The device 100 can, for example, be implemented in a computer device, such as a personal computer device, or other electronic devices, such as a mobile phone, mobile communication device, personal digital assistant (PDA), and the like.

The example device 100 includes a processing device 102, a first data store 104, a second data store 106, input devices 108, output devices 110, and a network interface 112. A bus system 114, including, for example, a data bus and a motherboard, can be used to establish and control data communication between the components 102, 104, 106, 108, 110 and 112. Other example system architectures can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

Example input devices 108 can include a keyboard, a mouse, a stylus, etc., and example output devices 110 can include a display device, an audio device, etc. The network interface 112 can, for example, include a wired or wireless network device operable to communicate data to and from a network 116. The network 116 can include one or more local area networks (LANs) and/or a wide area network (WAN), such as the Internet.

In some implementations, the device 100 can include input method editor (IME) code 101 in a data store, such as the data store 106. The input method editor code 101 can be defined by instructions that upon execution cause the processing device 102 to carry out input method editing functions. In an implementation, the input method editor code 101 can, for example, include interpreted instructions, such as script instructions, for example, JavaScript or ECMAScript instructions, that can be executed in a web browser environment. Other implementations can also be used, for example, compiled instructions, a stand-alone application, an applet, a plug-in module, etc.

Execution of the input method editor code 101 generates or launches an input method editor instance 103. The input method editor instance 103 can define an input method editor environment, for example, user interface, and can facilitate the processing of one or more input methods at the device 100, during which time the device 100 can receive composition inputs for input characters, ideograms, or symbols, such as, for example, Hanzi characters. For example, the user can use one or more of the input devices 108 (for example, a keyboard, such as a Western-style keyboard, a stylus with handwriting recognition engines, etc.) to input composition inputs for identification of Hanzi characters. In some examples, a Hanzi character can be associated with more than one composition input.

The first data store 104 and/or the second data store 106 can store an association of composition inputs and characters. Based on a user input, the input method editor instance 103 can use information in the data store 104 and/or the data store 106 to identify one or more candidate characters represented by the input. In some implementations, if more than one candidate character is identified, the candidate characters are displayed on an output device 110. Using the input device 108, the user can select from the candidate characters a Hanzi character that the user desires to input.

In some implementations, the input method editor instance 103 on the device 100 can receive one or more Pinyin composition inputs and convert the composition inputs into Hanzi characters. The input method editor instance 103 can, for example, use compositions of Pinyin syllables or characters received from keystrokes to represent the Hanzi characters. Each Pinyin syllable can, for example, correspond to a key in the Western style keyboard. Using a Pinyin input method editor, a user can input a Hanzi character by using composition inputs that include one or more Pinyin syllables representing the sound of the Hanzi character. Using the Pinyin IME, the user can also input a word that includes two or more Hanzi characters by using composition inputs that include two or more Pinyin syllables representing the sound of the Hanzi characters. Input methods for other languages, however, can also be facilitated.

Other application software 105 can also be stored in data stores 104 and/or 106, including web browsers, word processing programs, e-mail clients, etc. Each of these applications can generate a corresponding application instance 107. Each application instance can define an environment that can facilitate a user experience by presenting data to the user and facilitating data input from the user. For example, web browser software can generate a search engine environment; e-mail software can generate an e-mail environment; a word processing program can generate an editor environment; etc.

In some implementations, a remote computing system 118 having access to the device 100 can also be used to edit a logographic script. For example, the device 100 may be a server that provides logographic script editing capability via the network 116. In some examples, a user can edit a logographic script stored in the data store 104 and/or the data store 106 using a remote computing system, for example, a client computer. The device 100 can, for example, select a character and receive a composition input from a user over the network interface 112. The processing device 102 can, for example, identify one or more characters adjacent to the selected character, and identify one or more candidate characters based on the received composition input and the adjacent characters. The device 100 can transmit a data communication that includes the candidate characters back to the remote computing system.

Figure 2:
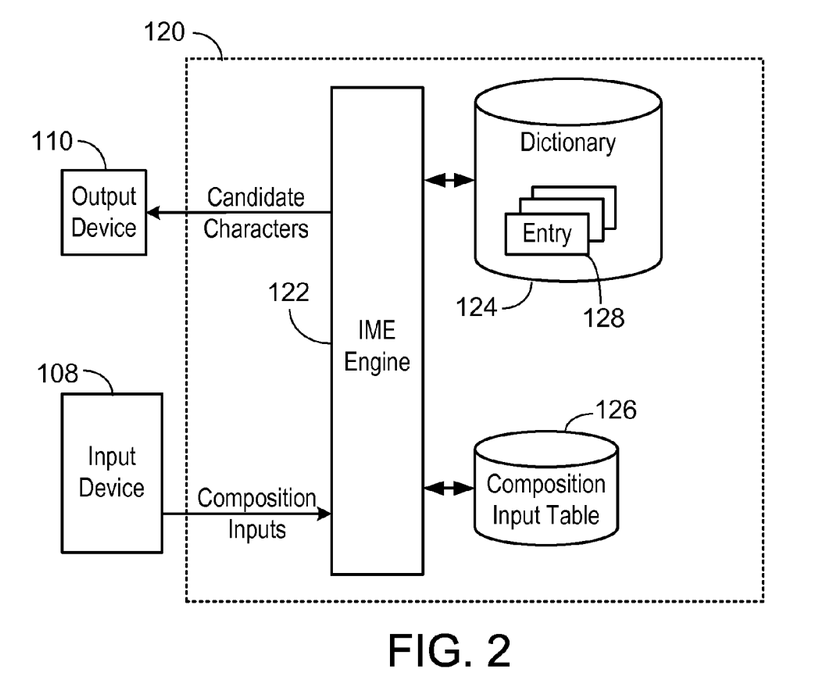
FIG. 2 is a block diagram of an example editor system.

FIG. 2 is a block diagram of an example input method editor system 120. The input method editor system 120 can, for example, be implemented using the input method editor code 101 and associated data stores 104 and 106. The input method editor system 120 includes an input method editor engine 122, a dictionary 124, and a composition input table 126. Other storage architectures can also be used. A user can use the IME system 120 to enter, for example, Chinese words or phrases by typing Pinyin characters, and the IME engine 122 will search the dictionary 124 to identify candidate dictionary entries each including one or more Chinese words or phrases that match the Pinyin characters.

The dictionary 124 includes entries 128 that correspond to characters, words, or phrases of a logographic script used in one or more language models, and characters, words, and phrases in Roman-based or western-style alphabets, for example, English, German, Spanish, etc. Each word corresponds to a meaning and may include one or more characters. For example, a word ("苹果") having the meaning "apple" includes two Hanzi characters "苹" and "果" that correspond to Pinyin inputs "ping" and "guo," respectively. The character "果" is also a word that has the meaning "fruit." The dictionary entries 128 may include, for example, idioms (for example, "胸有成竹"), proper names (for example, "奥地利共和国"), names of historical characters or famous people (for example, "成吉思汗"), terms of art (for example, "全球定位系统"), phrases (for example, "一去不复返"), book titles (for example, "红楼梦"), titles of art works (for example, "清明上河图"), or movie titles (for example, "卧虎藏龙"), etc., each including one or more characters.

Similarly, the dictionary entries 128 may include, for example, names of geographical entities or political entities, names of business concerns, names of educational institutions, names of animals or plants, names of machinery, song names, titles of plays, names of software programs, names of consumer products, etc. The dictionary 124 may include, for example, thousands of characters, words and phrases.

In some implementations, the dictionary 124 includes information about relationships between characters. For example, the dictionary 124 can include scores or probability values assigned to a character depending on other characters adjacent to the character. The dictionary 124 can include entry scores or entry probability values each associated with one of the dictionary entries 128 to indicate how often the entry 128 is used in general.

The composition input data store 126 includes an association of composition inputs and the entries 128 stored in the dictionary 124. In some implementations, the composition input data store 126 can link each of the entries 128 in the dictionary 124 to a composition input (for example, Pinyin input) used by the input method editor engine 122. For example, the input method editor engine 122 can use the information in the dictionary 124 and the composition input data store 126 to associate and/or identify one or more entries 128 in the dictionary 124 with one or more composition inputs in the composition input data store 126. Other associations can also be used.

In some implementations, the candidate selections in the IME system 120 can be ranked and presented in the input method editor according to the rank.

Figure 3:
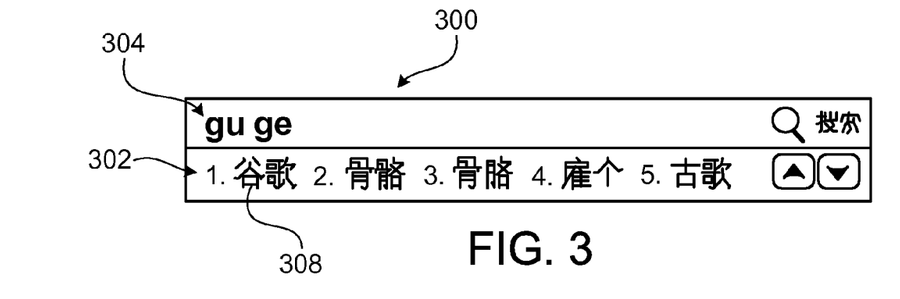
FIG. 3 is a diagram of an example input method editor environment.

FIG. 3 is a diagram of an example input method editor environment 300 presenting five ranked candidate selections 302. Each candidate selection can be a dictionary entry 128 or a combination of dictionary entries 128. The candidate selections 302 are identified based on the Pinyin inputs 304. A selection indicator 308 surrounds the first candidate selection, i.e., "谷歌", indicating that the first candidate selection is selected. The user can also use a number key to select a candidate selection, or use up and down arrow keys to move the selection indicator 308 to select the candidate selection.

As described above, the IME engine 122 accesses the dictionary 124 to identify candidate entries that are associated with Pinyin characters entered by the user. The dictionary 124 can be updated with new words or names periodically. For example, names and words that are commonly typed by users of the IME system 120 may change over time in response to news events and changes in the society. In some implementations, the dictionary 124 can be established and/or updated based on characters, words, and phrases that are identified from documents and search queries.

Figure 4:
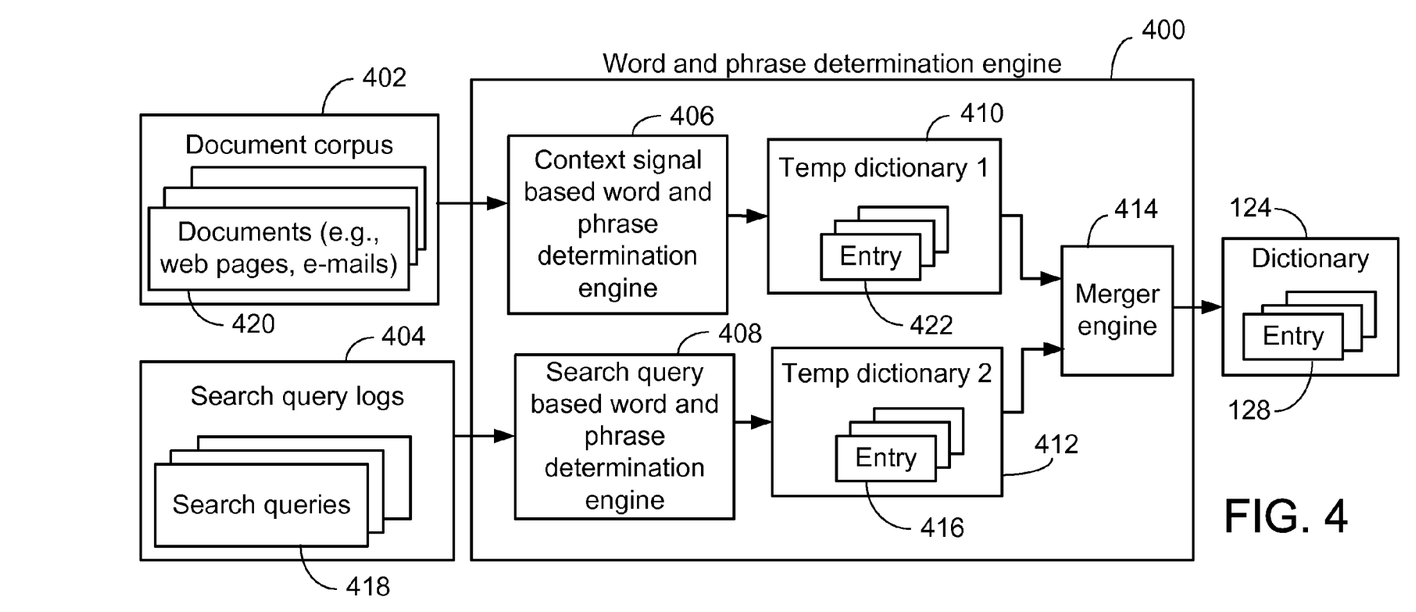
FIG. 4 is a diagram of an example word and phrase determination engine.

FIG. 4 is a diagram of an example of a word and phrase determination engine 400 that identifies dictionary entries 128 (for example, Chinese characters, words, and phrases). In some implementations, the engine 400 identifies Chinese words and phrases using a context signal based determination engine 406 and/or a query based determination engine 408. The context signal based determination engine 406 processes the documents 420 in a document corpus 402 to identify words and phrases using context signals. The query based determination engine 408 searches queries 418 in the search query logs 404 to identify Chinese words and phrases based on whether the words or phrases appear in the search queries alone or in combination with one or more other words or phrases. The identified words and phrases can be merged in a merger engine 414 and added as entries 128 to the dictionary 124. In some implementations, only one of the update methods can be used, for example, the dictionary 124 can be updated by use of either the document corpus 402 or the search query logs 404.

In some implementations, the context signal determination engine 406 is configured to determine candidate dictionary entries 422 from the documents 420 using context signals that identify bounded content. Example context signals include marks, characters, hypertext mark up language tags, and/or formatting that identify bounded content, such as quotation marks, special identifier characters, underlining, etc.

An example context signal can include Chinese double book title marks, for example, 《 》, and/or Chinese single book title marks, for example, < >. Chinese book title marks are commonly used to mark titles or names of documents and/or cultural works, for example, books, articles, newspapers, journals, and magazines. Chinese book title marks can also be used to mark the titles or names of cultural works such as, for example, songs, movies, television shows, plays, operas, dramas, symphonies, dances, paintings, statutes, and regulations, etc. The book title marks can identify multiple titles, for example, when a first title includes a second title, the first title is marked using the double book title mark, and the second title is marked using the single book title mark.

Chinese book title marks are context signals that mark the boundaries of words or phrases. Thus, when one or more characters (for example, Hanzi characters) appear inside a pair of Chinese book title marks, there is a high likelihood that the one or more characters correspond to one or more words or phrases. The following examples of names or titles of cultural works being marked by Chinese book title marks are illustrative: 《红楼梦》 ("Dream of the Red Chamber" book), 《清明上河图》 ("Upper River During the Qing Ming Festival" painting), 卧虎藏龙》 ("Crouching Tiger, Hidden Dragon" movie), and 《贝多芬第九交响曲》 ("Beethoven's Ninth Symphony").

The documents 420 can, for example, include documents that can be accessed over a network. The documents 420 can include, for example, web pages, e-books, journal articles, e-mail messages, advertisements, instant messages, blogs, legal documents, or other types of documents. The document corpus 402 may include documents 420 that cover a wide variety of subjects, such as news, literature, movies, music, political debates, scientific discoveries, legal issues, health issues, environmental issues, etc. The document corpus 402 can be established by gathering the documents 420 from, for example, a local area network or a wide area network, such as a corporate Intranet or the public Internet. The number of documents 420 processed can thus be in the range of millions of documents, or more. The documents 420 may include, for example, Hanzi characters, English characters, numbers, punctuation marks, symbols, HTML codes, etc. Other documents can also be used, for example, an electronic collection of literary works, an electronic library, etc.

In some implementations, the context signal determination engine 406 scans each of the documents 420 to identify pairs of Chinese book title marks. For each pair of Chinese book title marks that are identified, the engine 406 identifies a candidate entry 422 defined by a string of characters, for example, one or more Hanzi bounded by the pair of Chinese book title marks, and adds the candidate entry 422 to a first dictionary 410. The candidate entry 422 may include one or more words or phrases. If a term within a pair of Chinese book title marks is separated by a punctuation mark, such as a hyphen or colon, the term can be treated as two separated terms. For example, the engine 406 may process 《极品飞车：地下狂飙》 (the Chinese title for the computer game "Need for Speed: Underground") and determine that there are two candidate entries 422: "极品飞车" is one candidate entry 422 and "地下狂飙" is another candidate entry 422.

Each candidate entry 422 is associated with a count that represents the number of occurrences of the candidate entry 422 in the documents 420. In some implementations, the engine 406 is configured such that each occurrence of the candidate entry 422 in the same document 420 causes the count to be increased by one. Thus, for example, if a candidate entry 422 occurs three times in one document 420 and five times in another document 420, the count for the candidate entry is increased by eight. In some implementations, the engine 406 is configured such that the count is increased by one each time a candidate entry 422 occurs in a separate document, regardless of the number of the times that the candidate entry 422 occurs within each document. In this case, for example, if the candidate entry 422 occurs three times in one document 420 and five times in another document 420, the count associated with the candidate entry 422 is increased by two.

In some implementations, the engine 406 identifies pairs of Chinese book title marks that bound Chinese characters and do not bound characters of other languages. In this case, if a pair of Chinese book title marks bound a Chinese word and an English word, the Chinese word is not considered to be a candidate entry. In some implementations, the engine 406 processes the text bound by each pair of Chinese book title marks to remove non-Chinese characters and adds the remaining Chinese characters as a candidate entry 422 to the first dictionary 410.

In some implementations, the engine 406 sets a range for the number of characters included in each candidate entry 422. For example, the engine 406 may require that each candidate entry 422 has at least three Chinese characters and not more than ten Chinese characters.

After processing all the documents 420 to identify all the candidate entries 422 that are marked by Chinese book title marks, the engine 406 filters the candidate entries 422 to remove the candidate entries with counts less than a threshold value. In some implementations, the threshold value can be set between 20 to 40, for example, 30. The threshold can, for example, be utilized to remove candidate entries 422 that contain errors, have word(s) or phrase(s) that are rarely used, or that occur infrequently for some other reason.

In some implementations, the query based determination engine 408 is configured to identify candidate dictionary entries 416 from search query logs 404. The search query logs 404 can include search queries 418 submitted by multiple users of one or more search services over a period of time. The engine 408 identifies candidate entries 416 by finding consecutive strings of characters in the search queries 418. A search query 418 may include one or more candidate entries 416 that are separated by one or more white spaces or punctuation marks that are entered by a user who submitted the search query 418. For example, a search query "世界最快超级电脑" includes the phrase "世界最快" (meaning "world's fastest") and the word "超级电脑" (meaning "supercomputer") that are separated by a white space. Each of the phrase "世界最快" and the word "超级电脑" is identified by the engine 408 as a candidate entry 416.

In some implementations, the engine 408 assigns two count numbers to each candidate entry 416, a query count qf and a user-segmented count sf. The query count qf is used to represent the number of times that the candidate entry 416 is the only word or phrase in the search queries. For example, the query count qf associated with the entry "超级电脑" represents the number of search queries 418 that include only the word "超级电脑". The user-segmented count sf is used to represents the number of search queries 418 that each include the candidate entry 416 and one or more other words or phrases, where the candidate entry 416 and the one or more other words or phrases can be separated by, for example, one or more white spaces or punctuation marks entered by users who submitted the search queries. The candidate entry 416 and the associated query count qf and user-segmented count sf are stored in a second dictionary 412.

For example, if the engine 408 finds a search query 418 that includes "世界最快 超级电脑" the user-segmented count sf for the candidate entry "世界最快" is incremented by 1, and the user-segmented count sf for the candidate entry "超级电脑" is also incremented by 1. If the engine 408 finds a search query 418 that includes only "超级电脑", the query count qf for the candidate entry "超级电脑" is incremented by 1.

After the engine 408 processes all of the search queries to determine all of the candidate entries 416 and associated query counts qf and user-segmented counts sf, the engine 408 removes from the dictionary 412 candidate entries 416 in which the user-segmented count sf is equal to or greater than the query count sf (i.e., sf≧qf). The engine 408 also removes candidate entries 416 in which the query count qf is less than a threshold value (i.e., qf<threshold). In some implementations, the threshold value can be set to a value in the range of 3 to 10. Removing candidate entries having a low query count qf can remove candidate entries 416 that contain errors or are rarely used.

The candidate entries 416 remaining in the dictionary 412 are ones whose query count qf is greater than the user-segmented count sf (i.e., qf>sf) and has occurred at least a certain number of times in the search queries 418 (i.e., qf≧threshold). When the number of times a particular string of consecutive characters appears by itself in the search queries 418 is greater than the number of times that the string appears with one or more other strings or characters in the search queries 418, there is a high likelihood that the particular string of consecutive characters correspond to one or more words or phrases, and is suitable as a dictionary entry 128 in the IME dictionary 124.

In some implementations, the engine 400 includes a merger engine 414 that merges the dictionary entries 422 and 416 from the first and second dictionaries 410 and 412, respectively, by removing duplicate dictionary entries. The non-duplicative dictionary entries are added to the IME dictionary 124.

Figure 5:
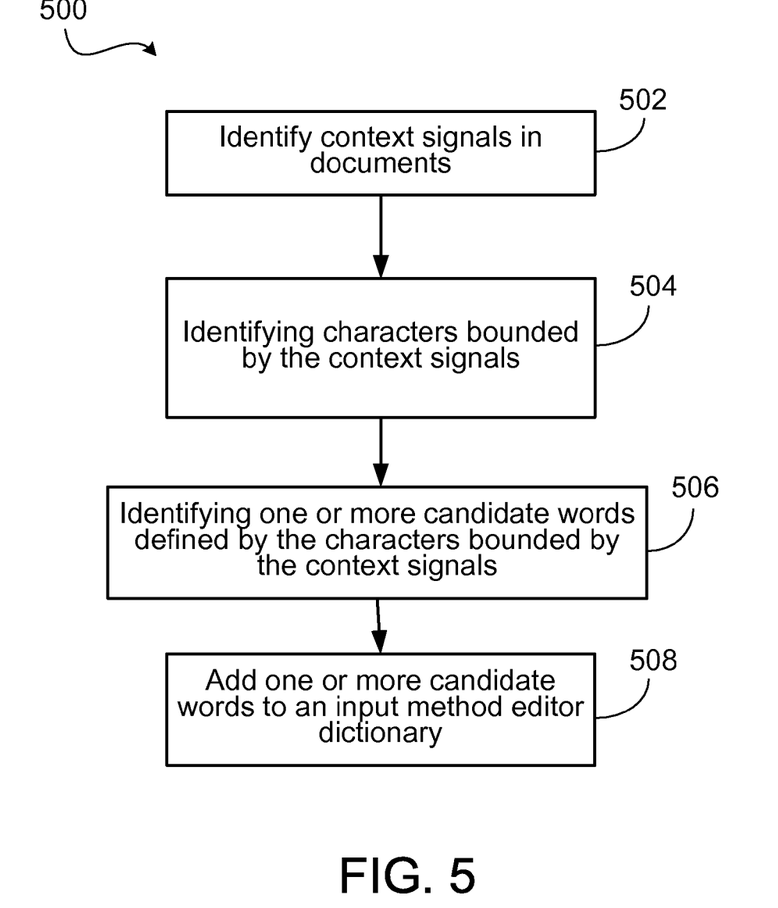
FIG. 5 is a flow diagram of an example process for determining words and phrases based on a document corpus.

FIG. 5 is a flow diagram of an example process 500 for determining words and phrases based on a document corpus (for example, document corpus 402). The process 500 can, for example, be implemented in a system that includes one or more server computers.

The process 500 identifies context signals in documents (502), and identifies characters bounded by the context signals (504). For example, the context signals can be Chinese book title marks, the characters can be Hanzi characters, and the documents can be the documents 420 in the document corpus 402 of FIG. 4. For example, the engine 406 of FIG. 4 can identify the context signals and the characters bounded by the context signals.

The process 500 identifies one or more candidate words defined by the characters bounded by the context signals (506). For example, the candidate words can be the entries 422 of FIG. 4.

The process 500 adds one or more candidate word to an input method editor dictionary (508). For example, the dictionary can be the first dictionary 410 of FIG. 4 or the IME dictionary 124 of FIG. 2.

Figure 6:
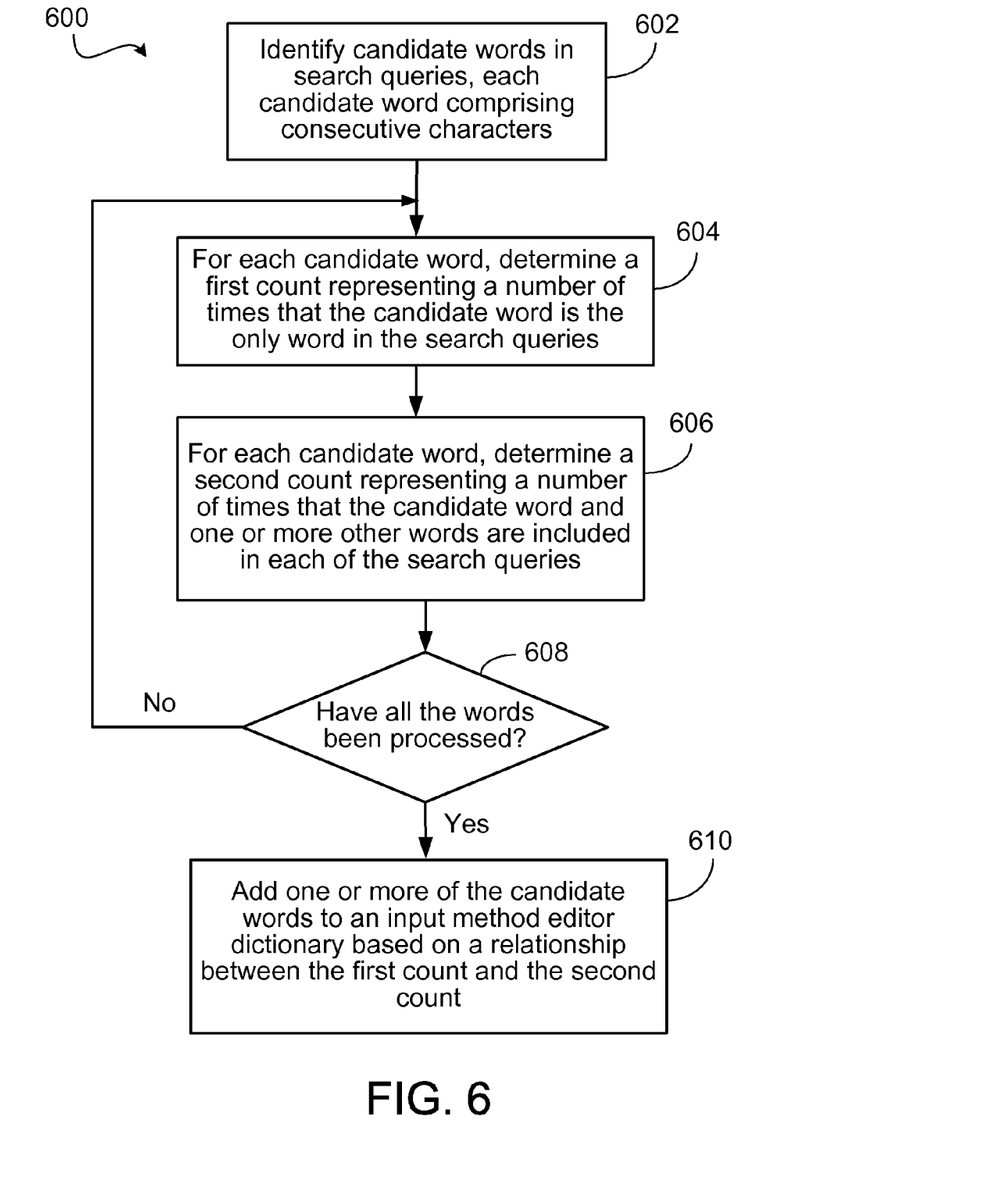
FIG. 6 is a flow diagram of an example process for determining words and phrases based on search query logs.

FIG. 6 is a flow diagram of an example process 600 for determining words and phrases based on search query logs (for example, search query logs 404). The process 600 can, for example, be implemented in a system that includes one or more server computers.

The process 600 identifies candidate words in search queries, each candidate word including one or more consecutive characters (602). For example, the characters can be Hanzi characters, the candidate words can be the entry 416, and the search queries can be the search queries 418 of search query logs 404 FIG. 4. For example, the engine 408 can identify the candidate words in the search queries 418.

For each candidate word, the process 600 determines a first count representing a number of times that the candidate word is the only word in the search queries (604), and determines a second count representing a number of times that the candidate word and one or more other words are included in each of the search queries (606). For example, in each of the search queries counted by the second count, the candidate word and the one or more other words can be separated by one or more white spaces or punctuation marks entered by the user. The engine 408 can determine the first count and the second count, for example, qf and sf.

After determining all the words have been processed (608), the process 600 adds one or more of the candidate words to an input method editor dictionary based on a relationship between the first count and the second count (610). For example, the dictionary can be the first dictionary 410 of FIG. 4 or the IME dictionary 124 of FIG. 2. For example, the engine 408 may add a candidate word to the dictionary when the first count is greater than the second count.

In some implementations, the processes 500 and 600 can be combined and the words and phrases can be added to a dictionary by a merger process.

Figure 7:
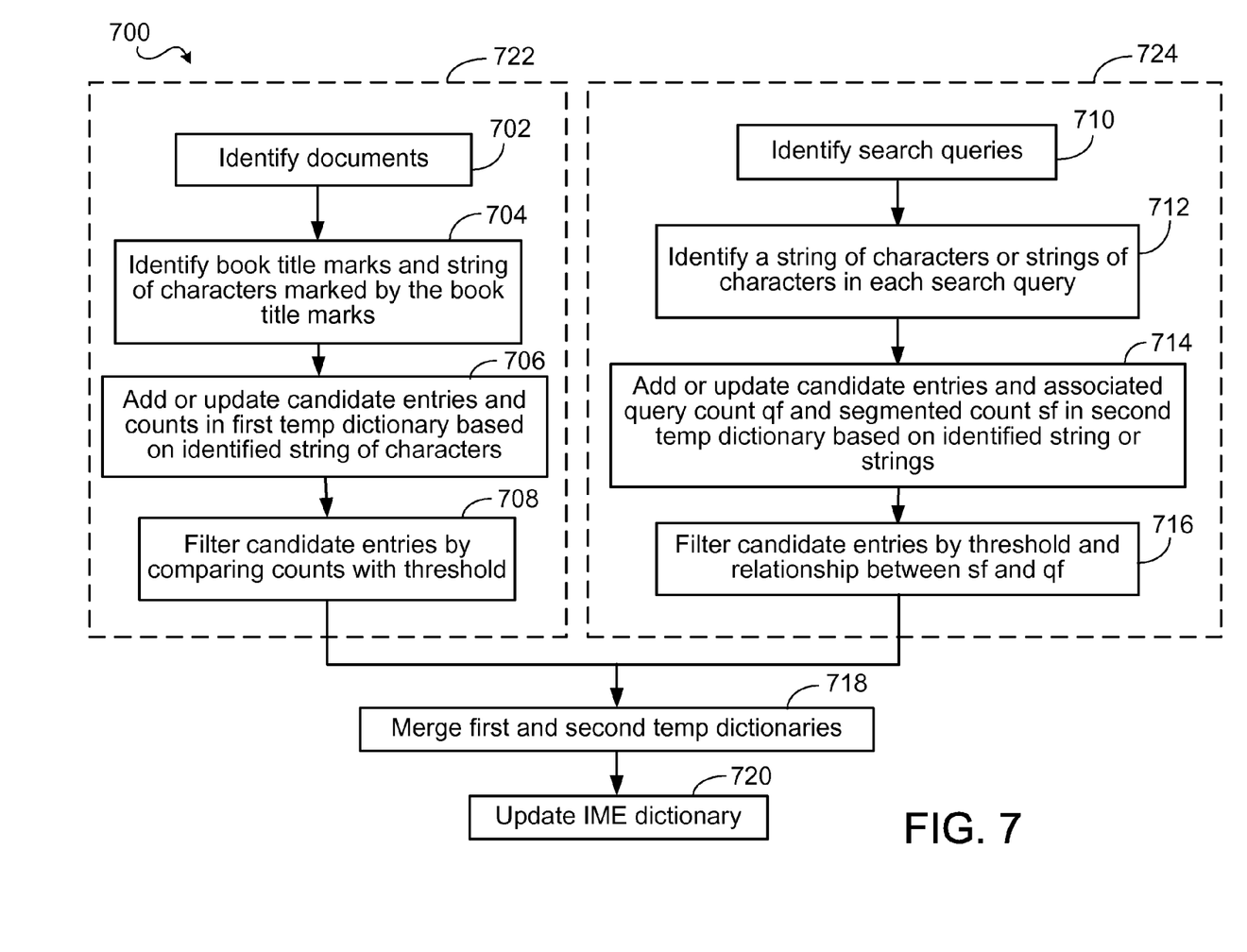
FIG. 7 is a flow diagram of an example process for determining words and phrases.

FIG. 7 is a flow diagram of an example process 700 for determining words and phrases based on a document corpus (for example, document corpus 402) and search query logs (for example, search query logs 404). The process 700 can, for example, be implemented in a system that includes one or more server computers. The process 700 includes two processes 722 and 724 that can be performed in parallel to generate first and second dictionaries that are merged into a final dictionary.

The process 722 identifies documents (702). For example, the documents can be the documents 420 in the document corpus 402 of FIG. 4.

The process 722 identifies pairs of Chinese book title marks in the documents 420, and identifies strings of characters marked by the pairs of Chinese book title marks (704). For example, the Chinese book title marks can be 《 》 <or <>, and the string of characters can include Hanzi characters. For example, the engine 406 of FIG. 4 can identify the Chinese book title marks and strings of characters.

The process 722 designates each string of characters marked by the Chinese book title marks as a candidate entry, and adds the candidate entry to a first dictionary (706). The process 722 also associates a count with the candidate entry, in which the count represents the number of occurrences of the candidate entry in the documents. For example, the first dictionary can be the first dictionary 410 of FIG. 4, and the engine 406 can add or update the candidate entries 422 and associated counts in the first dictionary 410.

After all the documents have been processed to identify all the pairs of Chinese book title marks, and all the strings of characters marked by the Chinese book title marks have been added as candidate entries to the first dictionary, the process 722 filters the candidate entries in the first dictionary by comparing the counts with a threshold value (708). If a count is lower than the threshold value, the candidate entry associated with the count is removed from the first dictionary. For example, the engine 406 can filter the candidate entries 422 in the first dictionary 410.

The process 724 identifies search queries (710). For example, the search queries can be the search queries 418 of the search logs 404 of FIG. 4.

For each search query, the process 724 identifies a string of consecutive characters, or strings of consecutive characters that are separated by white space(s) or symbol(s) that are not characters, where the white space(s) or symbol(s) are entered by the user (712). For example, the characters can be Hanzi characters, and the search queries can be the search queries 418 of FIG. 4. For example, the engine 408 can identify the string of consecutive characters, or the strings of consecutive characters in each of the search queries 418.

The process 724 identifies a candidate entry as being defined by each string of consecutive characters, and adds the candidate entry to a second dictionary (714). The process 724 also associates a query count qf and a user-segmented count sf with each candidate entry. The query count qf represents the number of search queries that include only the candidate entry, and the user-segmented count sf represents the number of search queries that each includes the candidate entry and one or more other strings of characters.

For example, the candidate entries can be the candidate entries 416 of FIG. 4, and the second dictionary can be the second dictionary 412. For example, the engine 408 can add or update the candidate entries 416 in the second dictionary 412, and can initialize or update the query counts qf and user-segmented counts sf associated with the candidate entries 416.

After all the search queries have been processed and all the strings of consecutive characters have been added as candidate entries to the second dictionary, the process 724 filters the candidate entries in the second dictionary (716). The process 724 compares the query count qf to the user-segmented count sf, and compares the query count qf to a threshold value. For example, the process 722 removes from the second dictionary the candidate entries in which the query count qf is less than a threshold, and removes candidate entries in which the query count qf is equal to or less than the user-segmented count sf. After filtering, the candidate entries in the second dictionary are ones in which the query count qf is greater than the user-segmented count sf, and the query count qf is at least the threshold value. For example, engine 408 filters the candidate entries 416 in the second dictionary 412.

After the processes 722 and 724 are completed, each of the first and second dictionaries have candidate entries. The process 700 merges the first and second dictionaries by removing duplicate candidate entries to generate a final dictionary (718). The candidate entries in the final dictionary are added to an IME dictionary (720). For example, the merger engine 414 of FIG. 4 can be used to merge the first and second dictionaries 410 and 412, and the candidate entries in the final dictionary can be added to the IME dictionary 124 of FIG. 2.

In some implementations, rather than using Chinese book title marks to identify candidate dictionary entries, hypertext markup language (HTML) title tags can be used to identify candidate dictionary entries from web documents. For example, a pair of HTML tags <title> and </title> mark the title of an HTML document. A string of characters bounded by the <title> and </title> HTML tags can be identified as a candidate dictionary entry and added to the dictionary 124 if a threshold criterion is met (for example, the number of times that the string of characters appear in the web documents is greater than a threshold value).

Although various implementations have been described, other implementations can also be used. For example, various forms of the flows shown above may be used, with steps re-ordered, added, or removed. Also, although several implementations and methods have been described, it should be recognized that numerous other implementations are contemplated. For example, the input engine 122 can be capable of mapping composition inputs from a western keyboard to input Chinese, Japanese, Korean and/or Indic characters. In some examples, some or all implementations described can be applicable to other input methods, such as Cangjie input method, Jiufang input method, Wubi input method, or other input methods. The weight values for different types of documents, and the classification of types of documents, can be different from those described above. The number of words and documents being processed, and the sources of the documents in the document corpus 402, can be different from those described above. The processes 722 and 724 in FIG. 7 can be performed sequentially. In some implementations, the engine 406 may identify non-duplicative documents 420 in the document corpus 402, and identify candidate entries and associated counts based on the non-duplicative documents. In some implementations, the dictionary 124 can include characters, words, and phrases obtained from pre-existing dictionaries.

In some implementations, the context signal based engine 406 of FIG. 4 can be configured such that the count increases as a function of the number of times that the candidate entry 422 occurs in each document. For example, the count can be increased by one each time that the candidate entry 422 occurs in the same document, up to a limit (for example, three) for each document. Thus, if the upper limit is three and the candidate entry 422 occurs five times in the same document, the count is increased by three. For example, the count can be increased as a log function of the number of times that the candidate entry 422 occurs within the same document. In some implementations, the engine 406 is configured such that the count increases as a function of the location where the candidate entry 422 occurs in each document. For example, the count can be increased by 1.5 if the candidate entry 422 appears in the title of the document 420 (or subject line of an e-mail message), and the count can be increased by 1 if the candidate entry 422 appears in other places of the document 420. Other methods for modifying the count based on occurrences of the candidate entry 422 in the documents 420 can also be used.

In some implementations, several dictionaries, for example, a legal dictionary, a medical dictionary, a science dictionary, and a general dictionary, can be used. Each dictionary can be established by starting with a dictionary associated with a particular field. The word and phrase determination engine 400 is used to process a document corpus having documents and search query logs having search queries biased toward the field associated with the dictionary. For example, to establish the probability values of the words in the legal dictionary, a document corpus having documents and search query logs having search queries biased toward the legal field can be used. The IME system 120 can allow the user to select the field of interest (for example, legal, medical, science) when entering characters, and the candidate words can be selected from the dictionary related to the field of interest.

Figure 8:
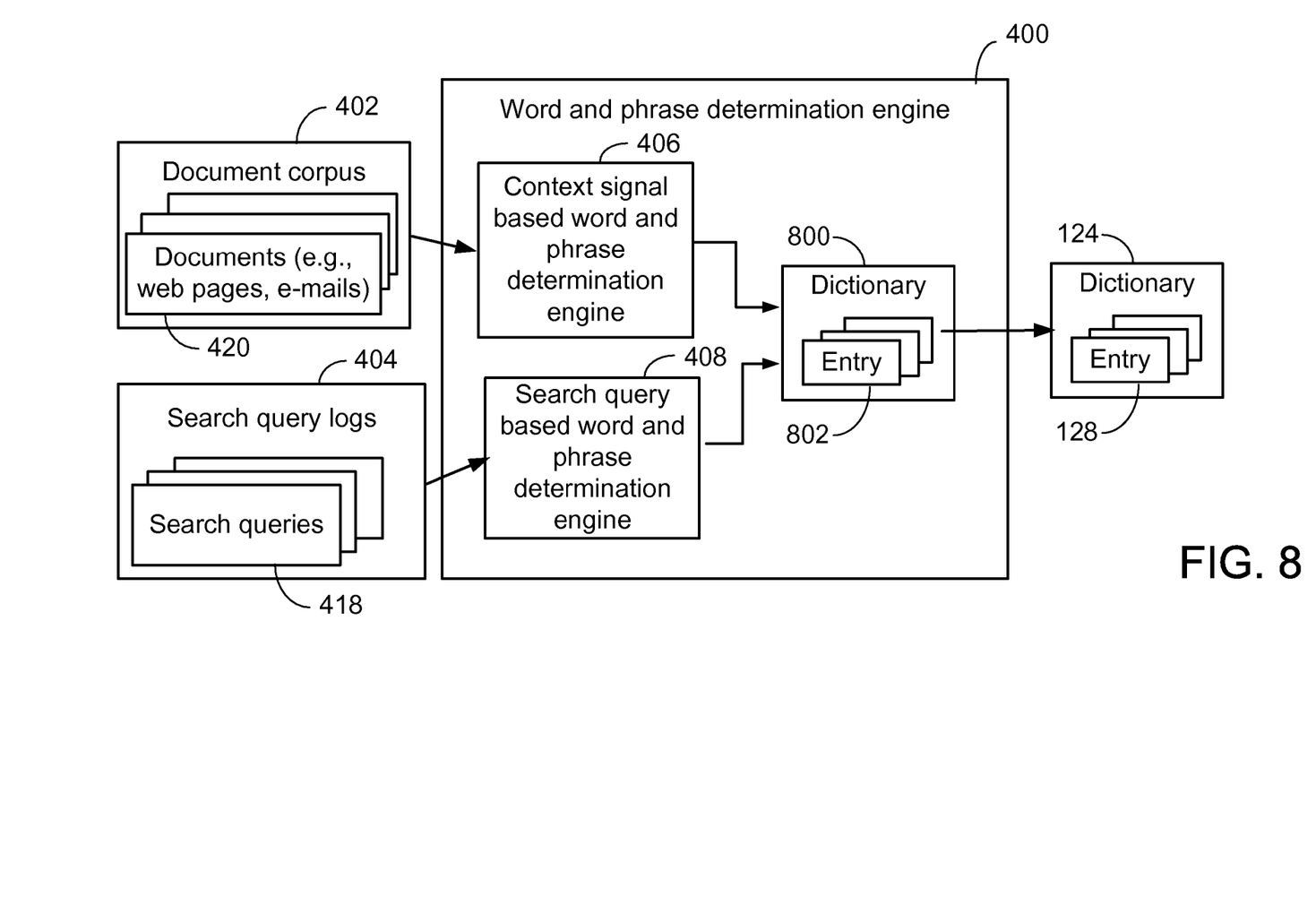
FIG. 8 is a diagram of an example word and phrase determination engine.

Referring to FIG. 8, in some implementations, the context signal based engine 406 and the search query based engine 408 write to a single dictionary 800. For example, the engine 406 processes the documents 420 and adds or updates candidate entries 802 to the dictionary 800. Each candidate entry 802 processed by the engine 406 is associated with a document occurrence count, representing the number of occurrences of the candidate entry 802 in the documents 420. The engine 408 processes the search queries 418 and adds or updates the candidate entries 802 to the dictionary 800. Each candidate entry 802 processed by the engine 408 is associated with a query count and a user-segmented count.

After the engines 406 and 408 process all of the documents 420 and search queries 418 to determine all of the candidate entries 802 and associated document occurrence counts, query counts, and user-segmented counts, the engine 400 removes from the dictionary 800 the candidate entries 802 in which certain criteria are met, for example: (1) the document occurrence count is less than a first threshold value, (2) the user-segmented count is equal to or greater than the query count, or (3) the query count is less than a second threshold value. The remaining candidate entries 802 are added to the IME dictionary 124. In some implementations, the engines 406 and 408 can write to the IME dictionary 124 directly, and add, update, or filter the entries 128 in the dictionary 124.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, for example, a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, for example, code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

Embodiments of the subject matter described in this specification can be implemented in a computing system that includes a back end component, for example, as a data server, or that includes a middleware component, for example, an application server, or that includes a front end component, for example, a client computer having a graphical user interface or a Web browser through which a user can interact with an implementation of the subject matter described is this specification, or any combination of one or more such back end, middleware, or front end components. The components of the system can be interconnected by any form or medium of digital data communication, for example, a communication network. Examples of communication networks include a local area network ("LAN") and a wide area network ("WAN"), for example, the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    identifying, using one or more computers, candidate words in search queries, each candidate word comprising one or more consecutive characters;
    for each candidate word:
        determining a first count representing a number of times that the candidate word is the only word in the search queries, and
        determining a second count representing a number of times that the candidate word and one or more other words are included in each of the search queries; and
    adding one or more of the candidate words to an input method editor dictionary based on a relationship between the first count and the second count.

2. The method of claim 1 wherein adding one or more of the candidate words to the input method editor dictionary comprises adding a candidate word to the input method editor dictionary when the first count is larger than the second count.

3. The method of claim 1 wherein adding one or more of the candidate words to the input method editor dictionary comprises adding a candidate word to the input method editor dictionary when the first count is larger than the second count and the first count is larger than a threshold value.

4. The method of claim 1 wherein determining the second count comprises counting a number of search queries that each includes the candidate word and one or more other words, in which the candidate word and the one or more other words are separated by one or more white spaces or punctuation marks entered by users who submitted the search queries.

5. The method of claim 1, comprising obtaining the search queries from a search log.

6. The method of claim 5 wherein the search log comprises search queries submitted by users of a search service.

7. The method of claim 1 wherein the candidate words comprise Hanzi characters.

8. The method of claim 1 wherein the input method editor dictionary comprises a Chinese input method editor dictionary.

9. A system, comprising:
    a data store to store search queries; and
    a processing engine stored in computer readable medium and comprising instructions executable by a processing device that upon such execution cause the processing device to:
        identify candidate words in the search queries, each candidate word comprising one or more consecutive characters;
        for each candidate word:
            determine a first count representing a number of times that the candidate word is the only word in the search queries, and
            determine a second count representing a number of times that the candidate word and one or more other words are included in each of the search queries; and
        add one or more of the candidate words to an input method editor dictionary based on a relationship between the first count and the second count.

10. The system of claim 9 wherein the processing engine comprises instructions executable by the processing device and upon such execution cause the processing device to add a candidate word to the input method editor dictionary when the first count is larger than the second count.

11. The system of claim 9 wherein the processing engine comprises instructions executable by the processing device and upon such execution cause the processing device to add a candidate word to the input method editor dictionary when the first count is larger than the second count and the first count is larger than a threshold value.

12. The system of claim 9 wherein the processing engine comprises instructions executable by the processing device and upon such execution cause the processing device to count a number of search queries that each includes the candidate word and one or more other words, in which the candidate word and the one or more other words are separated by one or more white spaces or punctuation marks entered by users who submitted the search queries.

13. The system of claim 9 wherein the processing engine comprises instructions executable by the processing device and upon such execution cause the processing device to obtain the search queries from a search log.

14. The system of claim 13 wherein the search log comprises search queries submitted by users of a search service.

15. The system of claim 9 wherein the candidate words comprise Hanzi characters.

16. An apparatus comprising:
    one or more computers operable to provide:
        a dictionary having words identified based on a first count representing a number of times that the word is the only word in search queries and a second count representing a number of times that the word and one or more other words are in each of the search queries;
        an input method editor configured to select words from the dictionary.

17. The apparatus of claim 16 wherein the input method editor comprises a Chinese input method editor.

18. The apparatus of claim 16 wherein the words comprise Hanzi characters.

19. The apparatus of claim 16 wherein for each word in the dictionary, the first count associated with the word is larger than the second count associated with the word.

20. A system comprising:
means for identifying candidate words in search queries, each candidate word comprising one or more consecutive characters;
means for processing each candidate word by:
determining a first count representing a number of times that the candidate word is the only word in the search queries, and
determining a second count representing a number of times that the candidate word and one or more other words are included in each of the search queries; and
means for adding one or more of the candidate words to an input method editor dictionary based on a relationship between the first count and the second count.

21. The system of claim 20, comprising means for obtaining the search queries from a search log.

22. The system of claim 20 wherein the means for adding one or more of the candidate words to an input method editor dictionary comprises means for adding a candidate word to the input method editor dictionary when the first count is larger than the second count.

23. The system of claim 20 wherein the means for processing each candidate word comprises means for determining the second count by counting a number of search queries that each includes the candidate word and one or more other words, in which the candidate word and the one or more other words are separated by one or more white spaces or punctuation marks entered by users who submitted the search queries.

24. A system, comprising:
means for identifying candidate words based on a first count representing a number of times that the word is the only word in search queries and a second count representing a number of times that the word and one or more other words are included in each of the search queries; and
means for adding one or more of the candidate words to an input method editor dictionary.

25. The system of claim 24, comprising means for obtaining the search queries from a search log.

* * * * *